United States Patent
Asakura et al.

[11] Patent Number: 5,937,507
[45] Date of Patent: Aug. 17, 1999

[54] METHOD OF MAKING A MOTOR ACTUATOR

[75] Inventors: Yasunori Asakura, Kosai; Yukinobu Kujira, Toyohashi, both of Japan

[73] Assignee: ASMO Co., Ltd., Kosai, Japan

[21] Appl. No.: 08/916,008

[22] Filed: Aug. 21, 1997

Related U.S. Application Data

[63] Continuation of application No. 08/472,113, Jun. 7, 1995, abandoned.

[30] Foreign Application Priority Data

Jun. 24, 1994  [JP]  Japan  .................................... 6-166164
Feb. 20, 1995  [JP]  Japan  .................................... 7-055034

[51] Int. Cl.$^6$ ................................................ H02K 15/14
[52] U.S. Cl. ........................ 29/596; 29/883; 29/884; 310/42; 310/43; 310/68 R
[58] Field of Search ........................ 29/596, 883, 884; 310/42, 43, 68 R

[56] References Cited

U.S. PATENT DOCUMENTS

| | | |
|---|---|---|
| 4,876,909 | 10/1989 | Andrei-Alexandru et al. . |
| 4,926,075 | 5/1990 | Fushiya et al. ............................ 29/596 |
| 4,926,540 | 5/1990 | Kato ......................................... 29/596 |
| 4,930,370 | 6/1990 | Yoshida . |

FOREIGN PATENT DOCUMENTS

| | | |
|---|---|---|
| 30 21 948 | 4/1990 | Germany . |
| 62-33691 | 2/1987 | Japan . |
| 62-172611 | 7/1987 | Japan . |
| 63-28715 | 2/1988 | Japan . |
| 63-136938 | 6/1988 | Japan . |
| 64-29790 | 2/1989 | Japan . |
| 1-127347 | 8/1989 | Japan . |
| 2-85612 | 7/1990 | Japan . |
| 3-167774 | 7/1991 | Japan . |
| 3-183338 | 8/1991 | Japan . |
| 5-252692 | 9/1993 | Japan . |
| 7-14013 | 4/1995 | Japan . |
| 8-70553 | 3/1996 | Japan . |

*Primary Examiner*—Carl E. Hall
*Attorney, Agent, or Firm*—Oblon, Spivak, McClelland, Maier & Neustadt, P.C.

[57] ABSTRACT

A motor actuator has a housing, an output gearwheel rotated by a motor, a pattern board provided on one side of the output gearwheel, and a conducting unit. The conducting unit is formed integrally with brushes contacting the pattern board and connector pins corresponding to each of the brushes and electrically connecting the brushes to other electrical components. The brushes and connector pins are fixed by an insulating resin so as to maintain the structure when link portions unneeded for electrical connection are cut.

6 Claims, 15 Drawing Sheets

METHOD OF MAKING A MOTOR ACTUATOR

This application is a Continuation of application Ser. No. 08/472,113 filed on Jun. 7, 1995, now abandoned.

BACKGROUND OF THE INVENTION

1. Field of the Invention

The present invention relates to a motor actuator and a manufacturing method thereof.

2. Description of Related Art

Japanese Utility Model Laid-Open Publication No. 62-33691 discloses a prior-art example of a motor actuator. This motor actuator has a brush provided on an output gear which contacts a printed circuit board so as to conduct a circuit and turn the actuator. A power supply plate and connector pins for connection to the outside are connected to the printed circuit board.

This power supply plate and connector pins are connected by soldering, which therefore incurs labor time for connection. Moreover, since the power supply plate and connector pins are manufactured as separate items, such problems as increased numbers of parts and higher cost have been inevitable. Also, attaching the brush to the output gear takes time.

SUMMARY OF THE INVENTION

The present invention is devised to overcome the foregoing conventional problems, and has as its objective the provision of a motor actuator and a method of manufacturing the same, in which the components can be reduced, enabling simplified manufacturing process and reduced cost.

In order to achieve this objective, according to the first aspect of the present invention, a motor actuator comprises a housing, an output gearwheel rotated by a motor, a pattern conductor provided on one side of the output gearwheel, a plurality of brushes contacting the pattern conductor, and connection means corresponding to each of the brushes and electrically connecting the brushes to any electrical components; wherein the connection means corresponding to each of the brushes and a corresponding brush are formed integrally and simultaneously from a conductive material, connected by link portions, and are molded into a unit with an insulating resin; and the link portions unnecessary for electrical conduction are cut.

Since the brushes and connection means are formed integrally, it is unnecessary to solder them.

Furthermore, since the brushes and connection means are formed into a unit, all can be fitted in a single operation.

Again, since the connection means are first molded with an insulating resin, the structure is maintained even when link portions unneeded for electrical connection are cut.

According to the second aspect of the present invention, it is preferable that the pattern conductor comprises a conducting portion formed circumferentially around the axis of the output gearwheel, and an insulating portion insulating the conducting portion; wherein the insulating portion and the conducting portion are concentric with the axis and offset by a certain angle; and at least one of the brushes avoids the insulating portion and conducts with the conducting portion, and at least one of the brushes slides on the pattern conductor in a circumferential direction, on which the insulating portion is formed.

In this way, when the brush which can slide on the insulating portion contacts the conducting portion, the brush conducts with another brush and the motor rotates. On the other hand, when the brush which can slide on the insulating portion contacts the insulating portion, the electrical connection between the brush and another brush is broken and the motor stops.

According to the third aspect of the present invention, it is preferable that the pattern conductor comprises a resistor portion having a certain resistivity and formed in an arc around the axis of the output gearwheel, and a conducting portion electrically connected to one end of the resistor portion; wherein at least one of the brushes contacts and conducts with the conducting portion, and at least one of the brushes contacts and conducts with the resistor portion.

As a result, a brush is connected to the conducting portion which is connected to one end of the resistor portion, and another brush contacts and conducts with the resistor portion at a particular position in the longitudinal direction. Since the conducting portion is electrically connected to one end of the resistor portion, depending on where the brush contacts the resistor portion, the length of the resistor portion between the contact point and the conducting portion varies, and thus he resistance value changes. As the output gearwheel is rotated, the latter brush slides over the resistor portion, causing a voltage drop from the varying resistance value, and is then electrically connected to the former brush. In this way, according to the present invention it is possible to vary the resistance value.

According to the fourth aspect of the present invention, it is preferable that at least one of the connection means is used as an external connector pin or a power supply plate. Here a set of external connector pins is connected to an external power supply and the like, and the power supply plate is connected to the motor.

According to the fifth aspect of the present invention, it is preferable that the connection means used as the external connector pin is formed by rib forming or folding over so as to give sufficient thickness thereto. In the present invention, the brushes and connection means are formed integrally, and whereas the brushes are required to be thin, the connection means used for an external connector pin requires sufficient thickness. Thus, the connection means is formed by rib forming or folding over so as to give sufficient thickness.

According to the sixth aspect of the present invention, it is preferable that the connection means is fixed to the housing by welding or press fitting. In this way, the connection means is fixed firmly to the housing.

According to the seventh aspect of the present invention, it is preferable that the housing comprises engaging portions engaging with the connection means, and the connection means comprises receiving portions corresponding to the engaging portions; and wherein the connection means is attached to the housing, when the engaging portions and receiving portions are engaged.

Furthermore, the connection means is attached to the housing, when the engaging portions and receiving portions are engaged. Thus, if the engaging portions and receiving portions are disposed in appropriate positions, the connection means will also be disposed in appropriate positions.

According to the eighth aspect of the present invention, it is preferable that the housing comprises a boss which supports a shaft of the output gearwheel, and the insulating resin comprises a ring portion which can engage with the outer periphery of the boss when the connection means is positioned at a predetermined distance from the shaft.

It is preferable that the contact points of the brushes and the center of the ring portion lie on the same straight line, and that the center of the ring portion and the center of the boss are coincident with the axis of the output gearwheel. In other words, the virtual line passes through the contact points of the brushes and the axis of the output gearwheel. If this is the case, then the mere engagement of the ring portion with the boss is sufficient to ensure that the contact points of the brushes are radially aligned on the surface of the output gearwheel, and the positioning task is made simple.

According to the ninth aspect of the present invention, it is preferable that an output shaft transmitting the driving force of the motor to the outside is connected to at least one damper in a vehicle air-conditioning system, and transmits the driving force in a direction to change the orientation of the damper; and wherein the damper is at least one of a damper for switching between an internal and external air, a damper for switching spit holes, and a damper for adjusting the proportion of cold and hot air.

According to the tenth aspect of the present invention, it is preferable that the insulating resin fixes said connection means and forms a connecting portion which connects an external plug. In this way, since the connecting portion is formed at the same time as the connection means are fixed, the manufacturing steps can be reduced.

According to the eleventh aspect of the present invention, it is preferable that a wall constituting the connecting portion has at least one of the connection means passing therethrough. Thus, since the connecting portion and the connection means are formed integrally, the strength is increased so as to reduce the liability to breakage. Since the housing is formed from a resin material only, and the connecting portion is formed integrally with the housing; therefore, repeated insertions and removals of the plug often result in breakage of the portion connecting the connecting portion to the main housing. According to the present invention the portion coupling the connecting portion is reinforced with the strength of the connection means, and thus the liability to breakage of the connecting portion is reduced.

According to the twelfth aspect of the present invention, preferably a method of manufacturing the motor actuator comprising the steps of: simultaneously forming the brushes and partially linked connection means from a conductive material; integrally fixing together the partially linked connection means by an insulating resin; cutting unneeded link portions between the connection means after fixing the connection means by the insulating resin; and after the cutting step, mounting the connection means in the housing.

In this way, forming simultaneously the brushes and the connection means from a conductive material improves the yield, and simplifies the manufacturing process. Furthermore, since the link portions connecting the connection means are cut after fixing together and partially linking the connection means, the cutting operation is simplified. Also, since only those link portions are cut as required, the connection means are adapted for a variety of circuits.

For example, six linked connection means can be connected individually to other components by cutting all the link portions. The link portions may be cut so as to leave three pairs of connection means, enabling a construction equivalent to three linked connection means.

Furthermore, mounting the integrally fixed connection means in the housing may simplify the mounting process.

According to the thirteenth aspect of the present invention, preferably a method of manufacturing the motor actuator comprises the steps of: simultaneously forming the brushes and partially linked connection means from a conductive material; integrally fixing together the partially linked connection means by an insulating resin, and forming a connecting portion; cutting unneeded link portions between the connection means after fixing the connection means by the insulating resin; and after the cutting step, mounting the connection means in the housing.

By this means, since the connecting portion is formed at the same time as the connection means is fixed, the manufacturing steps can be reduced. Moreover, the connecting portion and the connection means are formed integrally so as to increase the strength and reduce the liability to breakage.

PREFERRED EMBODIMENT OF THE INVENTION

A preferred embodiment of the present invention is now described with reference to the drawings.

Figure 1:
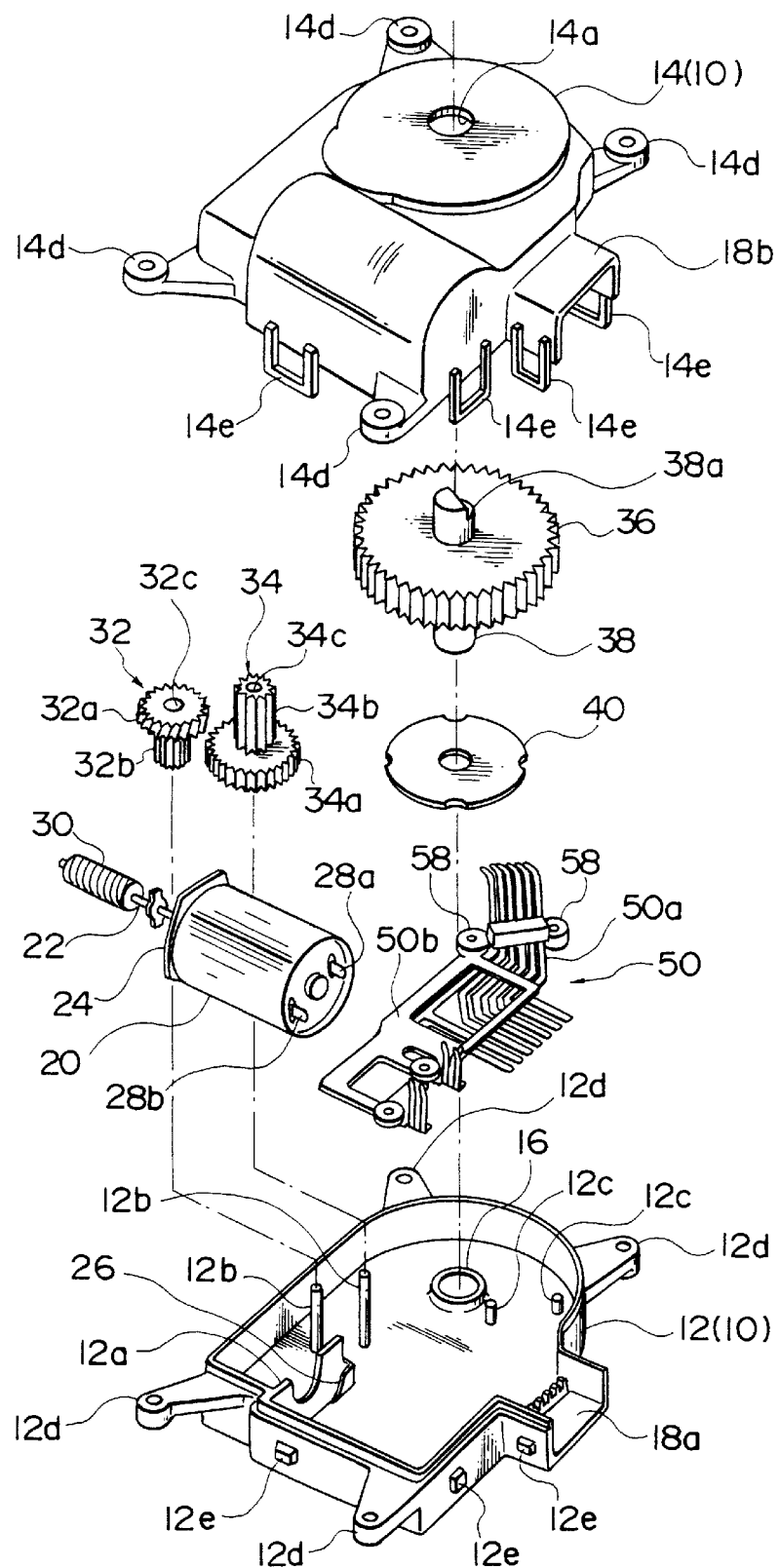
FIG. 1 is an exploded perspective view of a motor actuator of an embodiment according to the present invention.

FIG. 1 is an exploded perspective view of a motor actuator of an embodiment. This motor actuator controls the air-conditioning of a vehicle, and comprises a housing 10 which contains a motor 20, worm gear 30, reduction gears 32 and 34, output gear 36, pattern board 40, and conducting unit 50.

The housing 10 is formed of a synthetic resin such as a reinforced plastic, and comprises a casing 12 in which the above-mentioned elements are mounted, and a cover 14 which fits over the casing 12.

On the casing 12 are formed a motor mounting portion 12a for positioning and mounting the motor 20, support shafts 12b for rotatably supporting the reduction gears 32 and 34, mounting projections 12c for positioning and fixing by welding the conducting unit 50, a plurality of mounting lugs 12d for screw fixing to the vehicle, projections 12e for clipping on the cover 14, a boss 16 for supporting one end of a shaft 38 of the output gear 36, and a connecting portion 18a. The connecting portion 18a together with a connecting portion 18b provided on the cover 14 forms a socket into which a plug is inserted for electrical connection to the outside.

The cover 14 also has formed thereon mounting lugs 14d which align with the mounting lugs 12d for mounting on the vehicle, clips 14e which engage with the projections 12e, and an output aperture 14a through which the other end of the shaft 38 projects to the outside.

The motor 20 is electrically connected by two terminals 28a and 28b. A mounting plate 24 provided at: an output shaft 22 side may be slotted into a fixing slot 26 formed by the motor mounting 12a, and thus enabling the positioning and mounting of the motor 20. Further, the worm gear 30 is provided on the output shaft 22 of the motor 20.

Rotation of the worm gear 30 is transmitted through the reduction gears 32 and 34 to the output gear 36. In more detail, the reduction gears 32 comprise an integrally formed large-diameter gear 32a and small-diameter gear 32b, and the reduction gears 34 comprise an integrally formed large-diameter gear 34a and small-diameter gear 34b. Rotation of the worm gear 30 is transmitted to the large-diameter gear 32a of the reduction gears 32, is then output from the small-diameter gear 32b and transmitted to the large-diameter gear 34a of the reduction gears 34, and is then output from the small-diameter gear 34b to the output gear 36. The reduction gears 32 and 34 have holes 32c and 34c formed therethrough along the axi of rotation, and are mounted on the casing 12 of the housing 10 by passing the support shafts 12b through these holes 32c and 34c. Thus the rotation of the motor 20 is transmitted to the output gear 36.

The output gear 36 is formed integrally with the shaft 38, and the rotation of the small-diameter gear 34b is therefore transmitted to the shaft 38. In order to attach a crank not shown in the drawing to the end of the shaft 38, a cutout portion 38a is formed, to provide a meshing attachment.

The pattern board 40 is fixed to one surface of the output gear 36, and the pattern of conductors thereon is described later.

The conducting unit 50 comprises a conductive plate 50a and a support portion 50b formed of an insulating resin, and fixing holes 58 formed integrally in the conductive plate 50a and support portion 50b through which the mounting projections 12c may be passed and fixed by welding. Alternatively, the fixing holes 58 may be formed so that the mounting projections 12c may be press fit therein. Equally, it is possible to form engaging portions not, shown in the drawing on the casing 12 and corresponding portions not shown in the drawing on the conducting unit 50, and achieve the fixing by the engagement thereof. These engaging portions and corresponding portions may be constructed in a conventional manner.

The fixing holes 58 and mounting projections 12c are designed in such a way that the conducting unit 50 is disposed in an appropriate position. Specifically, the brushes 61 to 66 of the conducting unit 50 should be positioned so that the contact points with the pattern board 40 are aligned on a straight line passing through the axis of rotation of the output gear 36. In this respect, the fixing holes 58 and mounting projections 12c are positioned accurately, so that the conducting unit 50 can be positioned accurately simply by mounting the fixing holes 58 through mounting projections 12c.

Figure 2A:
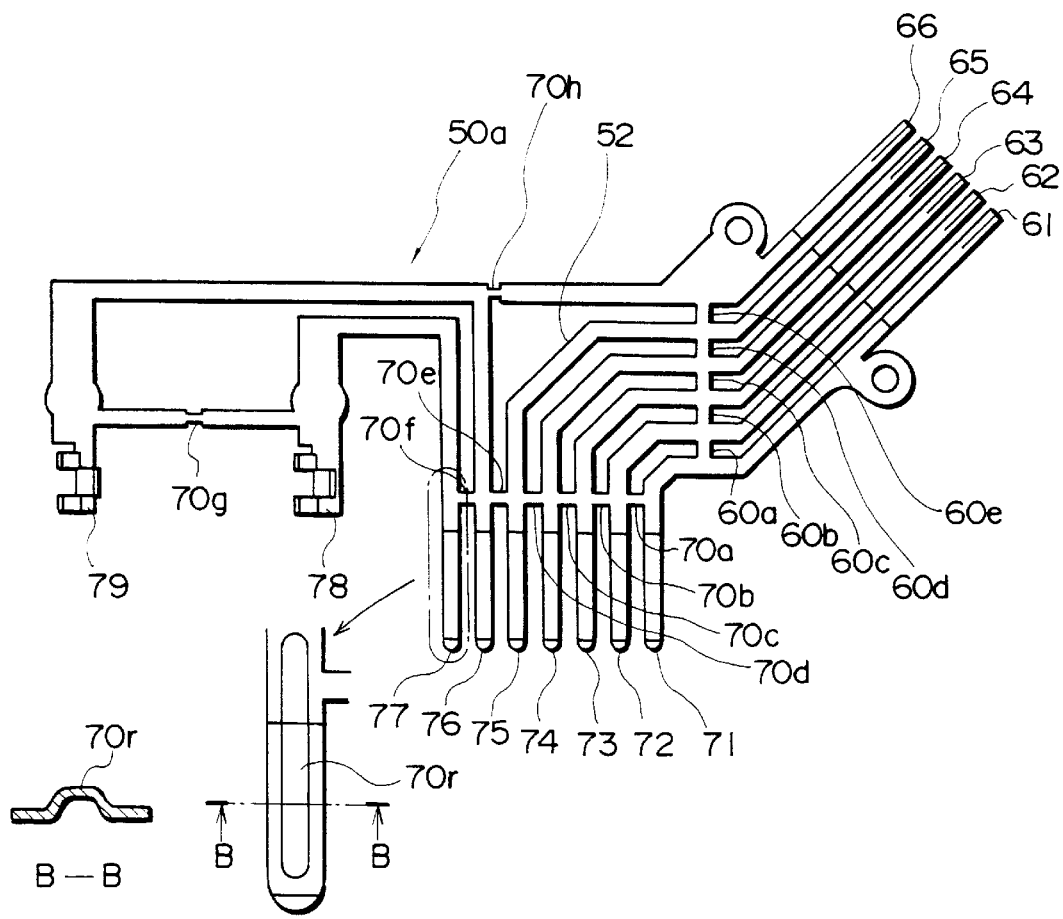
FIGS. 2A and 2B are enlarged views of a conductive plate in FIG. 1.
Figure 2B:
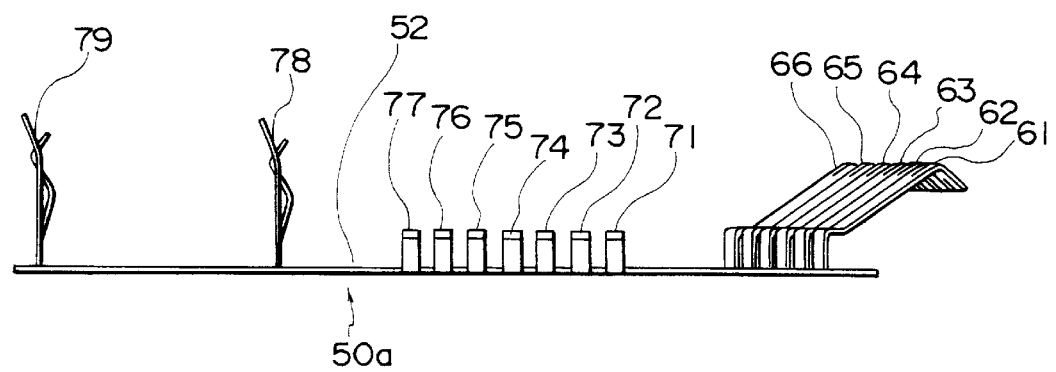

Enlarged views of the conductive plate 50a are shown in FIGS. 2A and 2B. FIG. 2A is a plan view and FIG. 2B is a front view. As shown in these figures, the conductive plate 50a comprises a flat power distribution section 52 from which extend upward brushes 61 to 66 which contact the pattern board 40, connector pins 71 to 77 for connection to the outside, and power supply clips 78 and 79 for connection to the terminals 28a and 28b on the motor 20. As shown in FIG. 2B, each of the power supply clips 78 and 79 has a pair of connection ends which clamp the terminals 28a and 28b of the motor 20. The conductive plate 50a is formed by punching a conductive metal plate in a predetermined form or similar, which is then bent to obtain the brushes 61 to 66 and other relief portions. Using this punching technique on a conductive plate eliminates the manufacturing steps in which such elements as brushes, connectors, power supply plate are formed separately and assembled by soldering or other means. Moreover, forming for example the brushes 61 to 66 simultaneously eliminates waste material and improves the yield. The manufacturing process can be simplified by carrying out the punching and bending processes simultaneously.

As shown in FIGS. 2A and 2B, the power distribution section 52 has the brushes 61 to 66, the connector pins 71 to 77, and the power supply clips 78 and 79 all connected together electrically. In other words, the power distribution section 52 includes a plurality of link portions 60a to 60e and 70a to 70h, by which it is connected together in an electrically conducting manner, and these link portions 60a to 60e and 70a to 70h are cut as necessary (detailed description below).

One of the brushes 61 to 66 and one of the connector pins 71 to 77 or power supply clips 78 and 79 are electrically conducted.

As described above, the connector pins 71 to 77 and brushes 61 to 66 are formed from a conductive plate and thus have the same thickness. And yet the brushes require resilience and should therefore be thinned, and the connectors should be made thicker to provide rigidity in order to avoid deformation when engaged with the mating connectors. In this embodiment the thickness of the connector pins 71 to 77 is increased by forming ribs 70r. This provides adequate thickness for the connector pins 71 to 77 to function as a connector. It is equally possible to provide the thickness by folding over the ends of the connector pins 71 to 77.

Then, as shown in FIG. 1, the conductive plate 50a is fixed by the support portion 50b. As shown in more detail in FIGS. 5 to 7, within the area of the power distribution section 52, the support portion sob is formed so that when all of the link portions 60a to 60e and 70a to 70h are cut, the brushes 61 to 66 and connector pins 71 to 77 do not come apart. In other words, the support portion 50b may be in any form as long as the brushes 61 to 66 and connector pins 71 to 77 do not come apart. However, it is preferable that the support portion 50b is designed to avoid the link portions 60a to 60e and 70a to 70h, so that these link portions 60a to 60e and 70a to 70h can be cut as required. In this way, a conducting unit 50 can be used for a variety of circuits.

Preferably, the link portions 60a to 60e and 70a to 70h can be cut either before or after the conducting unit 50 is mounted in the housing 10. Further, when the link portions 60a to 60e and 70a to 70h are to be cut after the conducting unit 50 is mounted in the housing 10, a laser may be used. In this case, it is preferable that through holes (not shown in the drawings) are formed in the casing 12 without damaging the housing 10, so that the laser beam can pass straight through.

Figure 3:
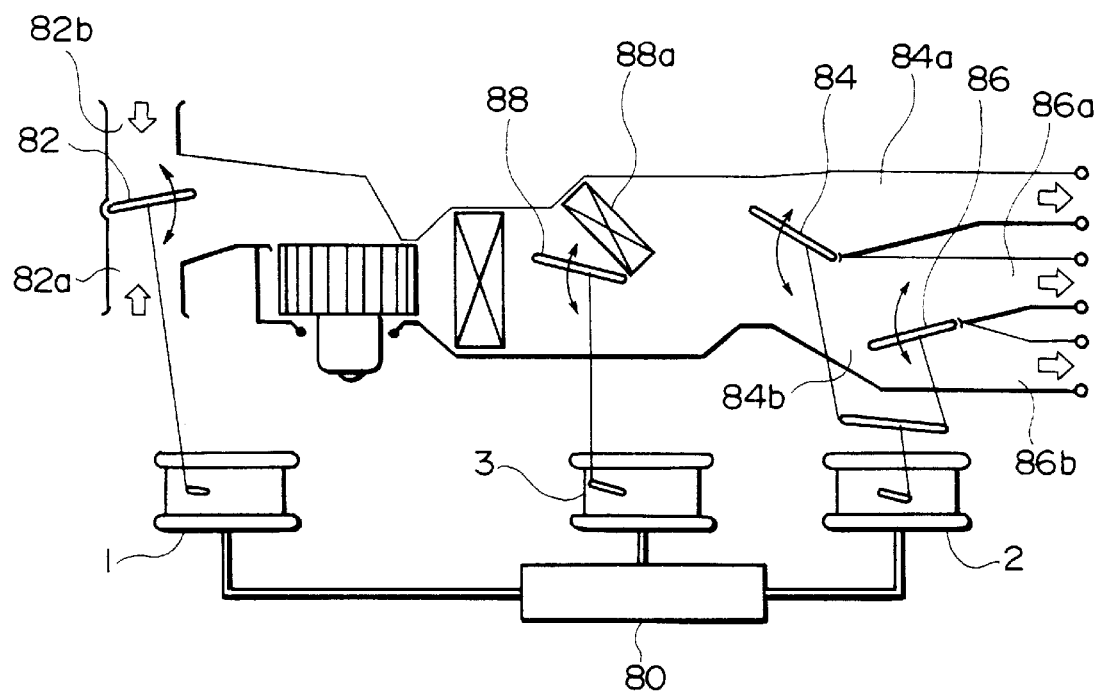
FIG. 3 is a schematic diagram showing the motor actuator used to control a vehicle air-conditioning system.

Next, FIG. 3 is a schematic diagram showing the motor actuator used to control a vehicle air-conditioning system. In this figure, motor actuators 1, 2 and 3 are operated by a controller 80. The motor actuator 1 drives a damper 82 for switching between an internal air intake duct 82a and an external air intake duct 82b. The motor actuator 2 drives dampers 84 and 86 for switching spit holes. More specifically, the damper 84 switches between a duct 84a leading to a defroster and a duct 84b leading to a spit hole disposed inside the vehicle. This duct 84b is switched by the damper 86 between a duct 86a leading to a spit hole near the dashboard and a duct 86b leading to a spit hole near foot level. The motor actuator 3 drives a damper 88 for adjusting the proportion of cold air to hot air, and opens and closes a heater core 88a. For the motor actuators 1, 2 and 3 to operate the dampers 82 to 88, respectively, it is necessary to convert the rotary motion to oscillatory motion. Since this may be achieved by a conventional mechanism and does not relate directly to the present invention, a detailed explanation thereof is omitted.

Figure 4A:
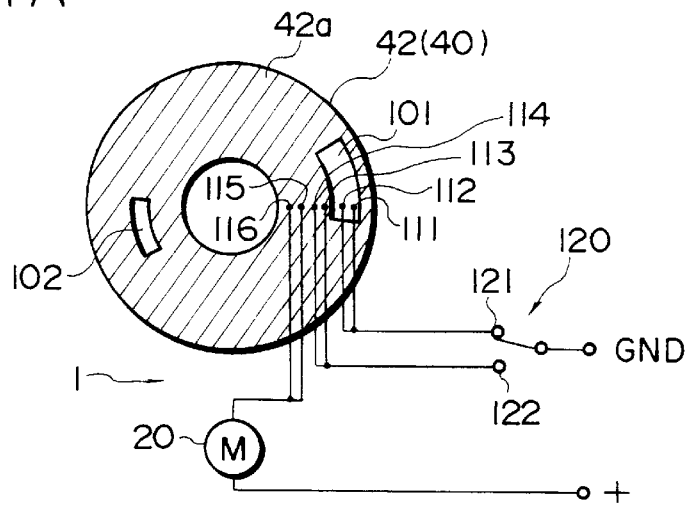
FIGS. 4A to 4C show circuits for driving the motor actuator of FIG. 3.
Figure 4B:
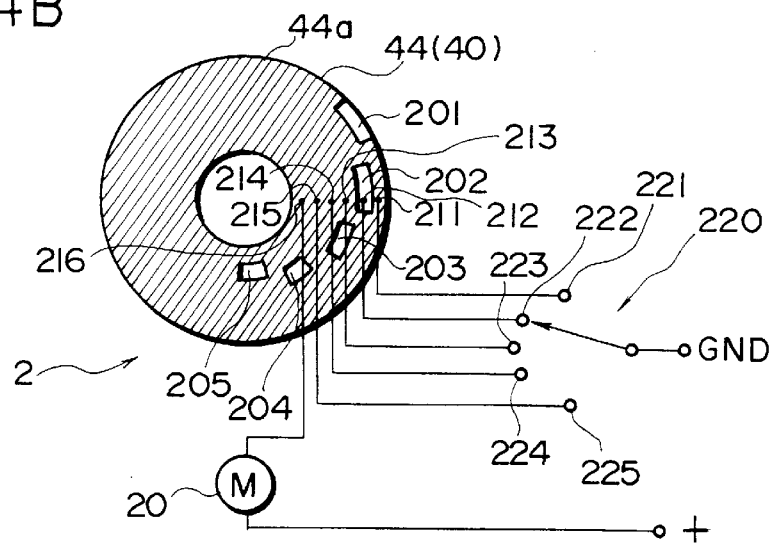
Figure 4C:
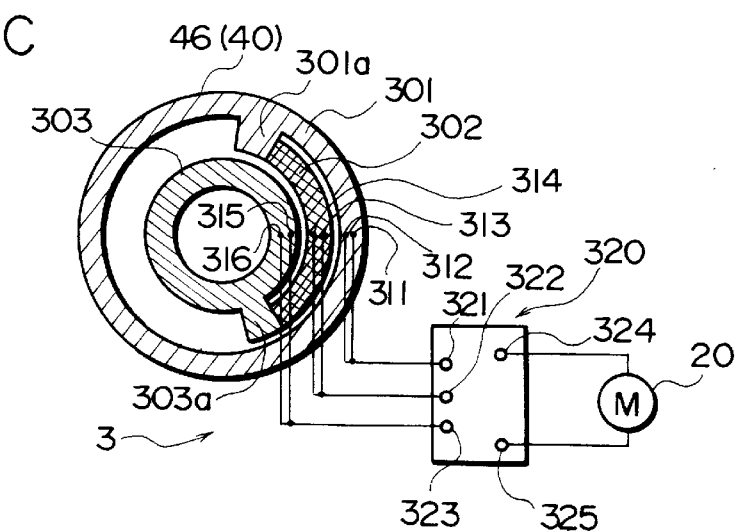

Circuits for driving the motor actuators 1, 2 and 3 are shown in FIGS. 4A to 4C. In these figures, FIG. 4A is a circuit for driving the motor actuator 1, FIG. 4B is a circuit for driving the motor actuator 2, and FIG. 4C is a circuit for driving the motor actuator 3. In FIGS. 4A to 4C, the pattern boards 42, 44 and 46 illustrate specific patterns for the pattern board 40 of FIG. 1.

The following description relates to the motor actuator 1.

In FIG. 4A, the pattern of the pattern board 42 comprises a circular conducting portion 42a having two insulating portions 101 and 102 which are concentric but located at circumferentially different positions and spaced apart by 180 degrees. The brushes 61 to 66 (see FIGS. 2A and 2B) slide on and contact the conducting portion 42a at contact positions shown in FIG. 4A as contact points 111 to 116. The brushes and contact points are related as follows: brush 61 to contact point 111, brush 62 to contact point 112, and so on, up to brush 66 to contact point 116.

The contact points 111 to 116 contact the conducting portion 42a circumferentially around the pattern board 42. The insulating portion 101 is provided on the path along which the contact points 111 and 112 contact the conducting portion 42a. Similarly, the insulating portion 102 is provided on the path along which the contact points 113 and 114 contact the conducting portion 42a. Further, the contact points 115 and 116 avoid either of the insulating portions 101 and 102.

The contact points 111, 112 and 113, 114 are connected to contacts 121 and 122 of a switch 120, respectively, and the switch 120 selectively connects one of the contacts 121 and 122 to ground. The contact points 115 and 116 are connected to terminal 28b of the motor 20 (see FIG. 1), and the other terminal 28a is connected to the power supply.

Figure 5:
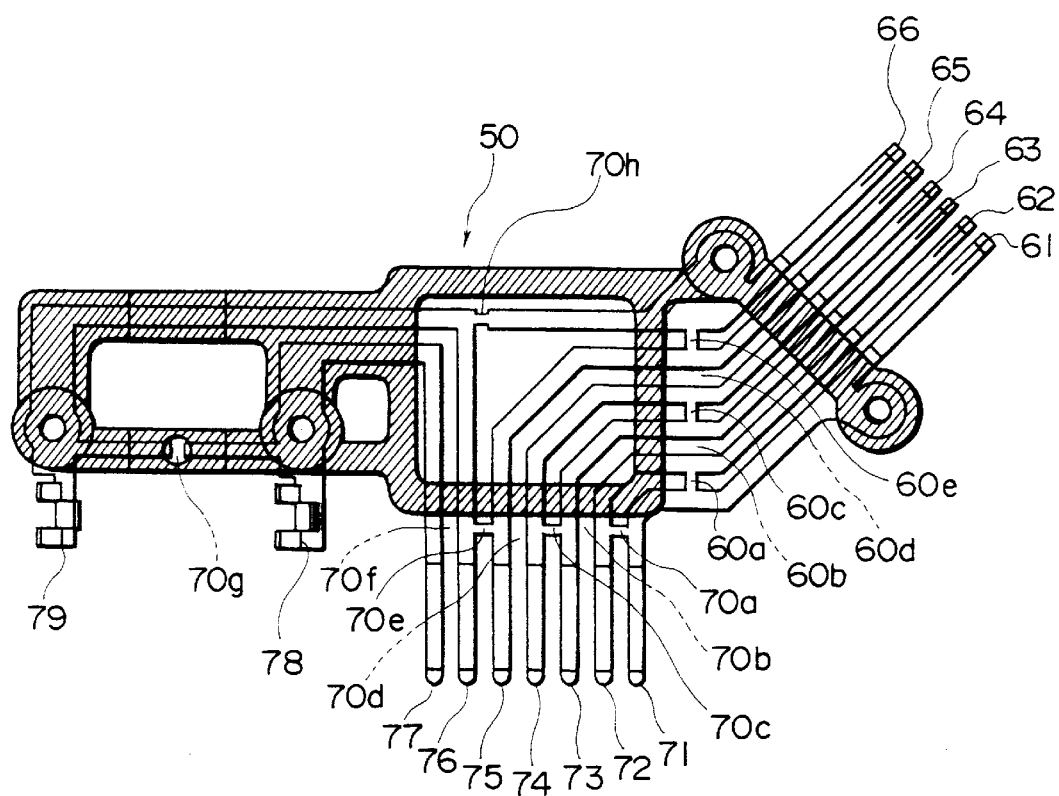
FIG. 5 shows a conducting unit forming part of the circuit in FIG. 4A after certain parts of link portions have been cut.

More specifically, such a circuit is formed by cutting certain parts of the link portions 60a to 60e and 70a to 70h of the conducting unit 50. FIG. 5 shows the conducting unit 50 forming part of the circuit in FIG. 4A after certain parts of the link portions have been cut.

In FIG. 5, the link portions 60b, 60d, 70b, 70d, 70f and 70g have been cut. By this means, the conducting state is as follows.

Firstly, the brushes 61 and 62 (contact points 111 and 112) are connected by link portions 60a and 70a, and are connected by connector pins 71 and 72 to a contact 121 not shown in this drawing (see FIG. 4A).

The brushes 63 and 64 (contact points 113 and 114) are connected by link portions 60c and 70c, and are connected by connector pins 73 and 74 to a contact 122 not shown in this drawing (see FIG. 4A). It should be noted that the brushes 62 and 63 are electrically interrupted by cutting the link portions 60b and 70b.

Furthermore, the brushes 65 and 66 (con-act points 115 and 116) are connected by link portions 60e and 70e, and are connected by the power supply clip 79 to the terminal 28b of the motor 20 not shown in this drawing (see FIG. 1). It should be noted that the brushes 64 and 65 are electrically interrupted by cutting the link portions 60d and 70d.

The other terminal 20a of the motor 20 (see FIG. 1) is connected to a power supply not shown in this drawing through the power supply clip 78 and connector pin 77. It should be noted that the connector pins 76 and 77 are electrically interrupted by cutting the link portions 70f and 70g.

Next, the operation of the motor actuator 1 is described, based on FIG. 4A. In the state shown in this figure, the contact 121 is grounded by the switch 120, but since the contact points 111 and 112 are on the insulating portion 101, and contact points 111, 112 and contact points 115, 116 are electrically cut, no current flows and the motor 20 does not rotate. If the switch 120 is now switched so as to ground the contact 122, the conducting portion 42a conducts between the contact points 111 and 112 and the contact points 115 and 116, and the motor 20 rotates. When the contact points 112 and 113 reach the insulating portion 102, the circuit is broken by the insulating portion 102, and the motor 20 then stops rotating.

In this way, switching the switch 120 enables the motor 20 to stop in either of the two positions: with the contact points 111 and 112 on the insulating portion 101, and with the contact points 113 and 114 on the insulating portion 102.

The pattern board 42 embodies a specific, pattern for the pattern board 40 of FIG. 1, and is attached to one surface of the output gear 36 which rotates around the shaft 38. As a result, since the pattern board 42 rotates in a manner corresponding to the rotation of the shaft 38, the two positions in which the motor 20 stops correspond to rotary positions of the shaft 38. In other words, the operation of the switch 120 enables the shaft 38 to stop in either of two positions.

In this way, by stopping the motor actuator 1 shown in FIG. 3 selectively in two positions, it is possible to dispose the damper 82 in a position in which the duct 82a or 82b is closed.

The next description relates to the motor actuator 2.

In FIG. 4B, the pattern of the pattern board 44 comprises a circular conducting portion 44a having insulating portions 201 to 205 which are concentric but located at circumferentially different positions and spaced apart by a certain angle. The brushes 61 to 66 (see FIGS. 2A and 2B) contact the conducting portion 44a at contact positions shown in FIG. 4B as contact points 211 to 216. The brushes and contact points are related as follows: brush 61 to contact point 211, brush 62 to contact point 212, and so on, up to brush 66 to contact point 216.

The contact points 211 to 216 contact the conducting portion 44a circumferentially around the pattern board 44. The insulating portions 201, 202, 203, 204 and 205 are provided on the paths along which respective contact points 211, 212, 213, 214 and 215 contact the conducting portion 44a. Further, the contact points 216 avoids either of the insulating portions.

The contact point 211, 212, 213, 214 and 215 are connected to switch contact points 221, 222, 223, 224 and 225 of a switch 220, respectively. Furthermore, the switch 220 selectively connects one of the switch contact points 221 to 225 to ground. The contact point 216 is connected to terminal 28b of the motor 20 (see FIG. 1), and the other terminal 28a is connected to the power supply.

Figure 6:
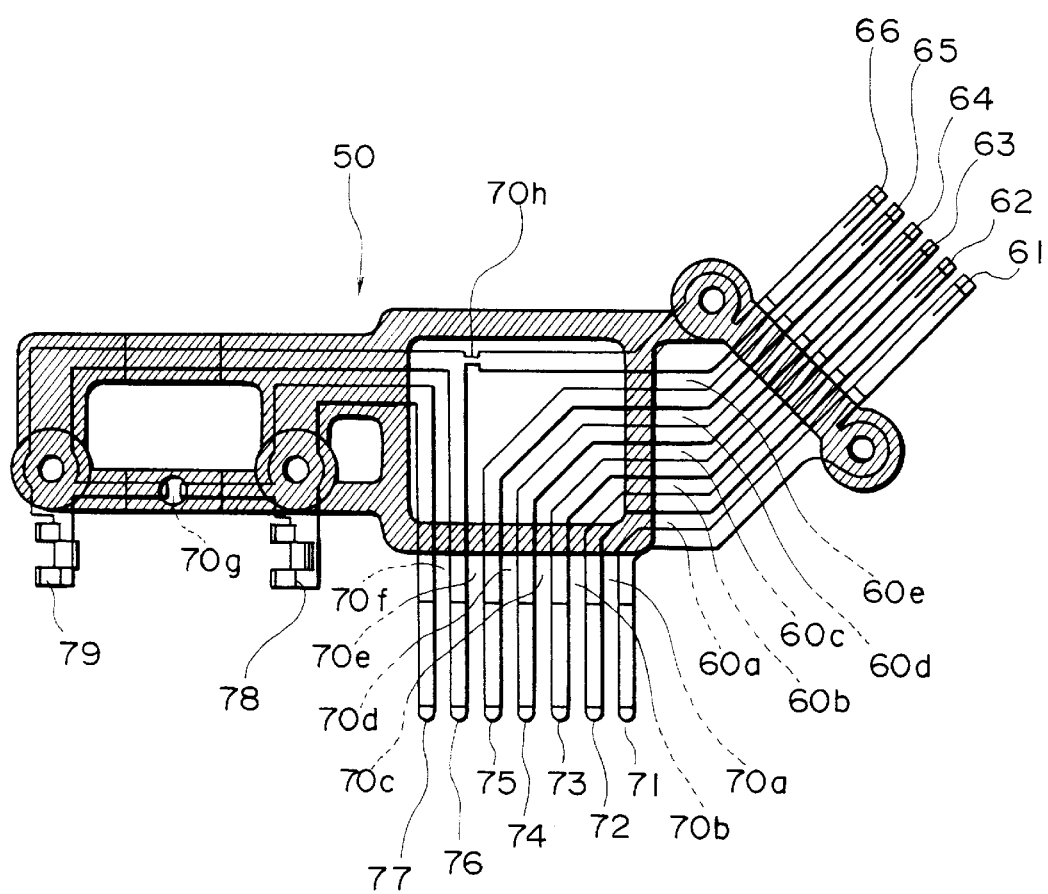
FIG. 6 shows a conducting unit forming part of the circuit in FIG. 4B after certain parts of link portions have been cut.

More specifically, such a circuit is formed by cutting certain parts of the link portions 60a to 60e and 70a to 70h of the conducting unit 50. FIG. 6 shows the conducting unit 50 forming part of the circuit in FIG. 4B after certain parts of the link portions have been cut.

In FIG. 6, all of the link portions excluding 70h are cut. The conducting state may be described as follows based on FIG. 6 and with reference to FIG. 4B. The brush 61 (contact point 211) is connected by connector pin 71 to the switch contact point 221, the brush 62 (contact point 212) is connected by connector pin 72 to the switch contact point 222, the brush 63 (contact point 213) is connected by connector pin 73 to the switch contact point 223, the brush 64 (contact point 214) is connected by connector pin 74 to the switch contact point 224, and the brush 65 (contact point 215) is connected by connector pin 75 to the switch contact point 225. Again, the brushes 61 to 65 are pairwise electrically interrupted by cutting the link portions.

Furthermore, the brush 66 (contact point 216) is connected by the power supply clip 79 to the terminal 28b of the motor 20 not shown in this drawing (see FIG. 1).

The other terminal 20a of the motor 20 (see FIG. 1) is connected to a power supply not shown in this drawing through the power supply clip 78 and connector pin 77. It should be noted that the power supply clips 78 and 79 are electrically interrupted by cutting the link portion 70g, and the connector pins 76 and 77 are electrically interrupted by cutting the link portion 70f.

Next, the operation of the motor actuator 2 is described based on FIG. 4B. In the state shown in this FIG., the switch contact point 222 is grounded by the switch 220, but since the contact point 212 is on the insulating portion 202, and the contact points 212 and 216 are electrically cut, no current flows and the motor 20 does not rotate.

If the switch 220 is switched so as to ground the switch contact point 221, the conducting portion 44a conducts between the contact points 211 and 216, and the motor 20 rotates. When the contact point 211 reaches the insulating portion 201, the circuit is broken by the insulating portion 201, and the motor 20 then stops rotating.

Similarly, if the switch 220 is switched to ground the switch contact point 223, the conducting portion 44a conducts between the contact points 213 and 216, and the motor 20 rotates. When the contact point 213 reaches the insulating portion 203, the circuit is broken by the insulating portion 203, and the motor 20 then stops rotating. If the switch 220 is switched to ground the switch contact point 224, the conducting portion 44a conducts between the contact points 214 and 216, and the motor 20 rotates. When the contact point 214 reaches the insulating portion 204, the circuit is broken by the insulating portion 204, and the motor 20 then stops rotating. Similarly, if the switch 220 is now switched to ground the switch contact point 225, the conducting portion 44a conducts between the contact points 215 and 216, and the motor 20 rotates. When the contact point 215 reaches the insulating portion 205, the circuit is broken by the insulating portion 205, and the motor 20 then stops rotating.

In this way, switching the switch 220 enables the motor 20 to stop in any of the five positions: with the contact point 211 on the insulating portion 201, with the contact point 212 on the insulating portion 202, with the contact point 213 on the insulating portion 203, with the contact point 214 on the insulating portion 204, and with the contact point 215 on the insulating portion 205.

In this way, by stopping the motor actuator 2 shown in FIG. 3 selectively in five positions by means of a link mechanism not shown in the drawings, it is possible to drive the dampers 84 and 86 to open or close the ducts 84a, 84b, 86a and 86b.

The next description relates to the motor actuator 3.

In FIG. 4C, the pattern of the pattern board 46 comprises a ring conducting portion 301 on the periphery of the pattern board 46, and a concentric and small-diameter conducting portion 303, which are electrically connected by a circular-arced resistor portion 302. In more detail, this resistor portion 302 is provided between a projection 301a projecting inward from the conducting portion 301 and a projection 303a projecting outward from the conducting portion 303, and is connected thereto. By comparison with the conducting portions 301 and 303, the resistor portion 302 has a high resistance, and serves as a resistor. The resistor portion 302 is formed in an arc shape, and is connected to the projections 301a and 303a by the ends thereof.

The brushes 61 to 66 (see FIGS. 2A and 2B) slide on and contact the conducting portions 301 and 303 or the resistor portion 302 portion 46a at contact positions shown in FIG. 4C as contact points 311 to 316. The brushes and contact points are related as follows: brush 61 to contact point 311, brush 62 to contact point 312, and so on, up to brush 66 to contact point 316.

The contact points 311 and 312 contact the conducting portion 301 circumferentially around the pattern board 46. The contact points 313 and 314 contact the resistor portion 302, and the contact points 315 and 316 contact the conducting portion 303 circumferentially around the pattern board 46.

Since the resistor portion 302 is arc-shaped and is connected to the conducting portions 301 and 303 by the ends thereof, the resistance value between contact points 311, 312 and contact points 313, 314 is smaller the closer the contact points 313 and 314 are to the projection 301a and is larger the closer the contact points 313 and 314 are to the projection 303a.

The contact points 311 and 312 are connected to a terminal 321 of a control unit 320, the contact points 313 and 314 are connected to a terminal 322 of the control unit 320, and the contact points 315 and 316 are connected together to a terminal 323 of the control unit 320.

The control unit 320 applies a fixed voltage across the terminals 321 and 323, and detects and stores such a voltage. From the detected voltage, it is possible to determine the rotational position of the output gear 36 (see FIG. 1) on which the pattern board 46 is mounted, and thus determine the rotational position of the shaft 38.

As described above since the resistance value between contact points 313 and 314 and between contact points 311 and 312 varies relative to the position of the contact points 313 and 314, the voltage across these contacts also varies. In other words, the pattern board 46 and the brushes 61 to 66 are combined to form a voltage dividing circuit. Conversely speaking, it is possible to detect the rotational position of the shaft 38 from the voltage mentioned above. Moreover, the degree of opening of the damper 88 (see FIG. 3) can be determined corresponding to the detected rotational position of the shaft 38. Thus, the control unit 320 determines the degree of opening of the damper 88 corresponding to a temperature in the controller 80 (see FIG. 3), the corresponding rotational position of the shaft 38 and the corresponding position of the contact points 313 and 314, and then computes correspondingly electric potential difference between the contact points 311, 312 and the contact points 313, 314.

The control unit 320 applies a given voltage across terminals 324 and 325 to drive the motor 20 in order to rotate the pattern board 46 in the direction in which the foregoing electric potential difference is detected. When the electric potential difference between the contact points 311, 312 and the contact points 313, 314 is the same as a voltage set corresponding to the degree of opening of the damper 88, the power supply is stopped so as to stop the motor 20. In this way the damper 88 is operated.

Figure 7:
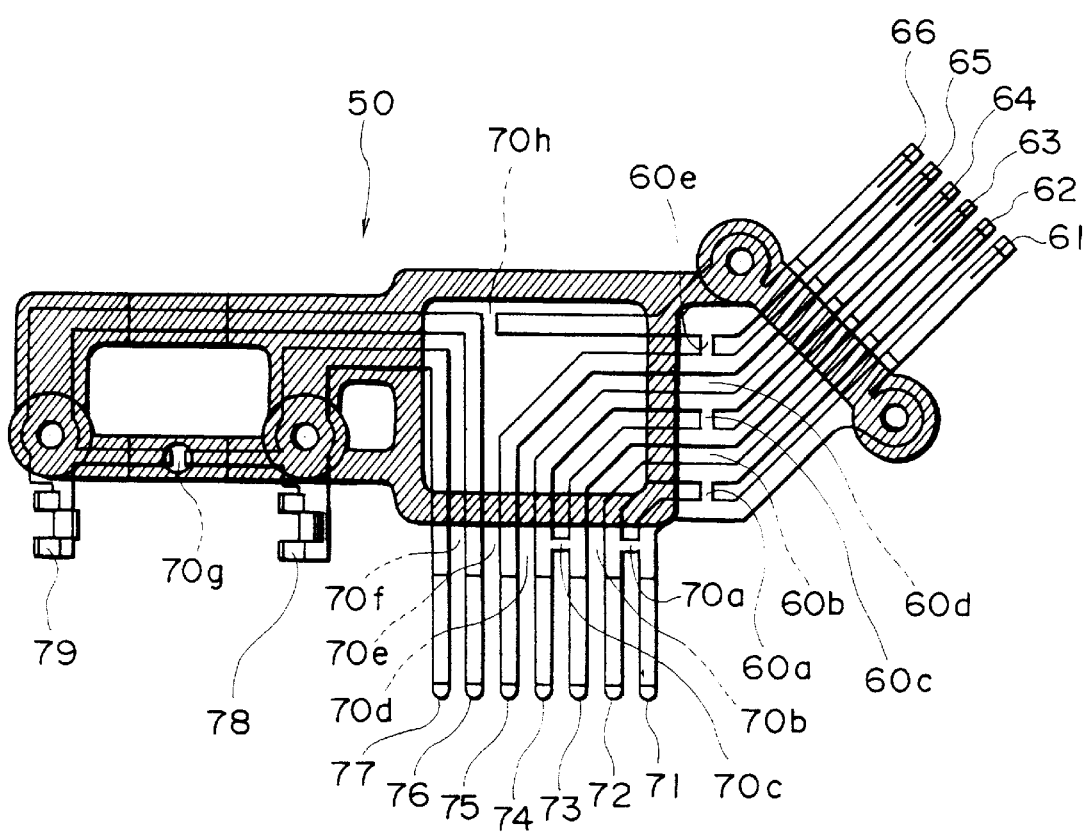
FIG. 7 shows a conducting unit forming part of the circuit in FIG. 4C after certain parts of link portions have been cut.

More specifically, this circuit also is formed by cutting certain parts of the link portions 60a to 60e and 70a to 70h of the conducting unit 50. FIG. 7 shows the conducting unit 50 forming part of the circuit in FIG. 4C after certain parts of the link portions have been cut.

In FIG. 7, the link portions 60b, 60d, 70b, 70d, 70e, 70f, 70g and 70h are cut. By this means, the conducting state is as follows.

Firstly, the brushes 61 and 62 (contact points 311 and 312) are connected together by link portions 60a and 70a, and are connected by connector pins 71 and 72 to the terminal 321 (see FIG. 4C).

The brushes 63 and 64 (contact points 313 and 314) are connected together by link portions 60c and 70c, and are connected by connector pins 73 and 74 to the terminal 322 (see FIG. 4C). It should be noted that the brushes 62 and 63 are electrically interrupted by cutting the link portions 60b and 70b.

Furthermore, the brushes 65 and 66 (contact points 315 and 316) are connected together by link portion 60e, and are connected to the terminal 323 (see FIG. 4C). It should be noted that the brushes 64 and 65 are electrically interrupted by cutting the link portions 60d and 70d.

The power supply clip 78 and connector pin 77 are connected electrically, and the power supply clip 79 and connector pin 76 are connected electrically, but the power supply clips 78 and 79 are electrically interrupted by cutting the link portions 70g and 70f. Thus, the terminal 28b of the motor 20 (not shown in this drawing) is connected by the power supply clip 79 through the connector pin 76 to one of the terminals 324 and 325, and the terminal 28a of the motor 20 is connected by the power supply clip 78 through the connector pin 77 to the other of the terminals 324 and 325.

Next, a variant form of this embodiment is described. In the embodiment described above, the connector pins 71 to 77 of the conductive plate 50a are formed so as to project laterally from the housing 10, but they may equally be formed so as to project upward from the housing 10.

Figure 8A:
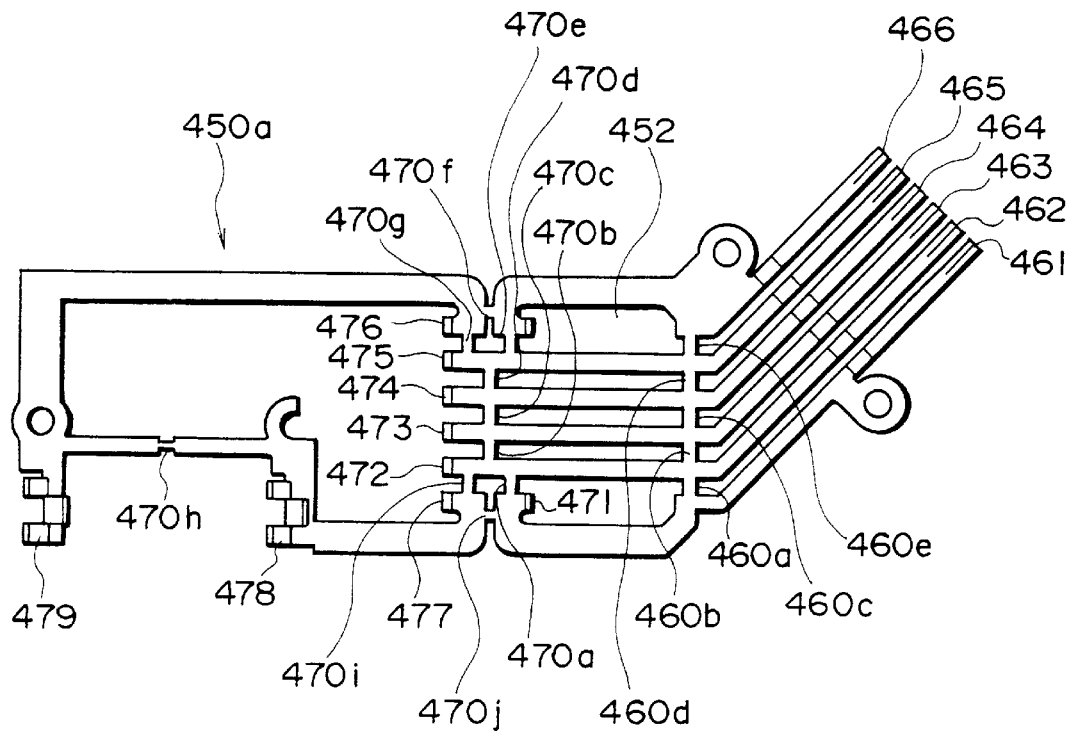
FIGS. 8A and 8B show a variant form of the conductive plate.
Figure 8B:
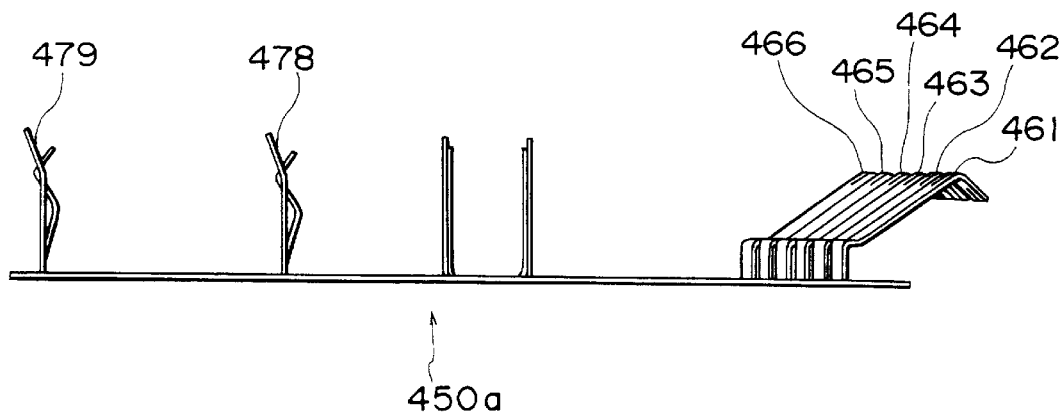

FIGS. 8A and 8B show a variant form of the conductive plate. FIG. 8A is a plan view, and FIG. 8B is a front view. As shown in these figures, a conductive plate 450a comprises a power distribution section 452 from which connector pins 471 to 477 for connection to the outside, and power supply clips 478 and 479 for connection to the terminals 28a and 28b (see FIG. 1) on the motor 20 are formed to extend orthogonally upward, and brushes 461 to 466 are formed to extend upward by a certain angle.

As shown in FIGS. 8A and 8B, the power distribution section 452 has the brushes 461 to 466, the connector pins 471 to 477, and the power supply clips 478 and 479 all connected together electrically. In other words, the power distribution section 452 includes a plurality of link portions 460a to 460e and 470a to 470j which are connected together in an electrically conducting manner and cut as necessary.

Other aspects of the form, manufacturing method and so forth of the conductive plate 450a are the same as for the conductive plate 50a, and thus description is omitted.

The description now turns to the circuits to be formed for the motor actuators 1, 2 and 3 in FIG. 3 using a conducting unit 450 having the conductive plate 450a.

Figure 9:
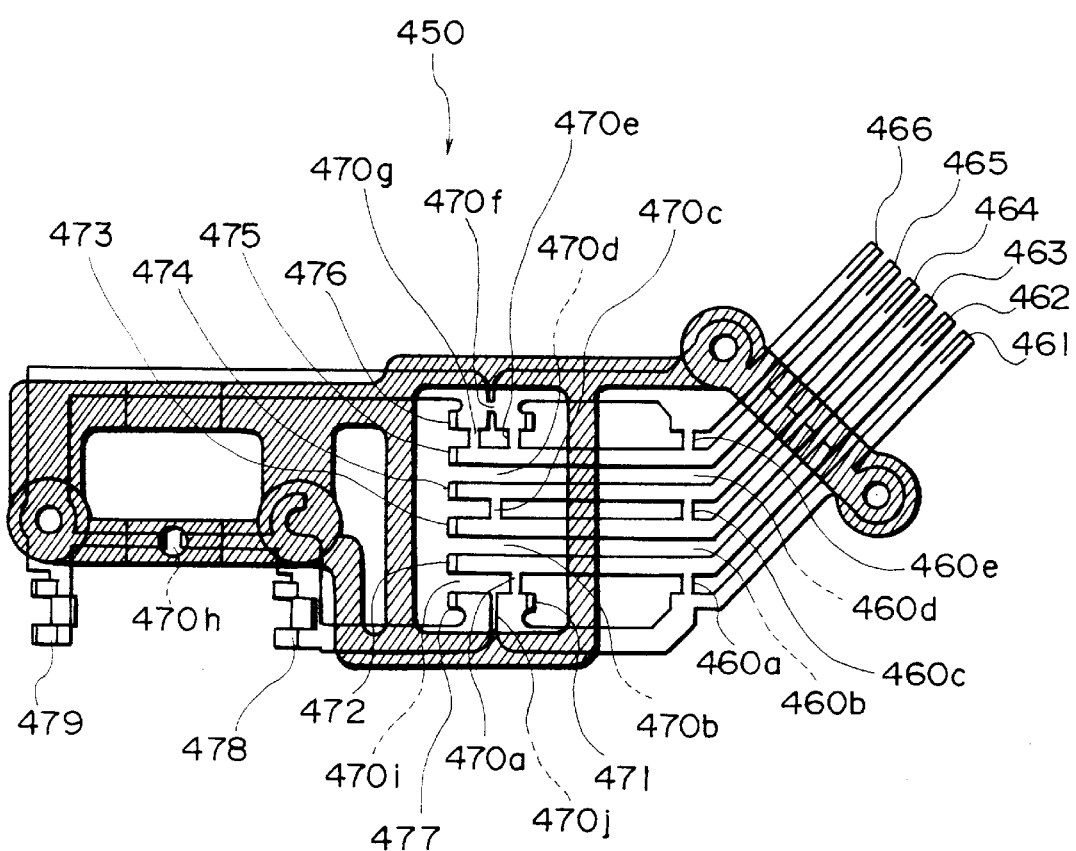
FIG. 9 shows a variant form of the conducting unit forming part of the circuit in FIG. 4A.

Firstly, FIG. 9 shows the conducting unit 450 forming a part of the circuit in FIG. 4A. In other words, FIG. 9 corresponds to FIG. 5.

In FIG. 9, the link portions 460b, 460d, 470b, 470d, 470h, 470i and 470j are cut. The circuit thus formed may be described, based on FIG. 9 and with reference to FIG. 4A, as follows.

Firstly, the brushes 461 and 462 (contact points 111 and 112) are connected together by link portions 460a and 470a, and are connected by connector pins 471 and 472 to a switch contact point 121 (see FIG. 4A).

The brushes 463 and 464 (contact points 113 and 114) are connected together by link portions 460c and 470c, and are connected by connector pins 473 and 474 to a switch contact point 122 (see FIG. 4A). It should be noted that the brushes 462 and 463 are electrically interrupted by cutting the link portions 460b and 470b.

Furthermore, the brushes 465 and 466 (contact points 115 and 116) are connected together by link portions 460e and 470e to 470g, and are connected by the power supply clip 479 to one terminal 28b of the motor 20 not shown in this drawing (see FIG. 1). It should be noted that the brushes 464 and 465 are electrically interrupted by cutting the link portions 460d and 470d.

The other terminal 20a of the motor 20 see FIG. 1) is connected to a power supply not shown in this drawing through the power supply clip 478 and connector pin 477.

Other aspects of the conducting state and operation of the motor actuator 1 are the same as in the embodiment of FIG. 5, and thus description thereof is omitted.

Figure 10:
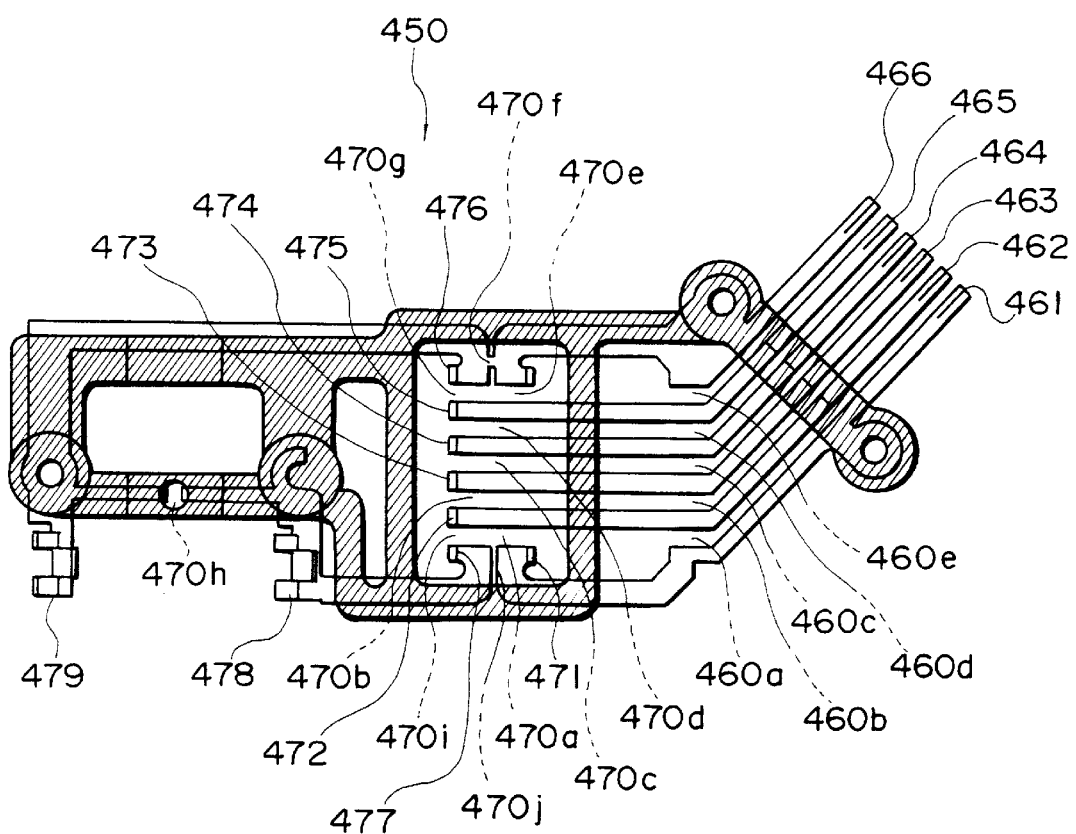
FIG. 10 shows a variant form of the conducting unit forming part of the circuit in FIG. 4B.

Next, FIG. 10 shows the conducting unit 450 forming a part of the circuit in FIG. 4B. In other words, FIG. 10 corresponds to FIG. 6.

In FIG. 10, all of the link portions other than 470f are cut. Based on FIG. 10 and with reference to FIG. 4B the conducting state may be described as follows. The brush 461 (contact point 211) is connected by connector pin 471 to a switch contact point 221, the brush 462 (contact point 212) is connected by connector pin 472 to a switch contact point 222, the brush 463 (contact point 213) is connected by connector pin 473 to a switch contact point 223, the brush 464 (contact point 214) is connected by connector pin 474 to a switch contact point 224, and the brush 465 (contact point 215) is connected by connector pin 475 to a switch contact point 225. Again, the brushes 461 to 465 are electrically interrupted by cutting the link portions.

Furthermore, the brush 466 (contact point 216) is connected by the power supply clip 479 to the terminal 28b of the motor 20 not shown in this drawing (see FIG. 1).

The other terminal 20a of the motor 20 (see FIG. 1) is connected to a power supply not shown in this drawing through the power supply clip 478 and connector pin 477. The power supply clips 479 and 478 are electrically interrupted by cutting the link portion 470h.

Other aspects of the conducting state and operation of the motor actuator 2 are the same as in the embodiment of FIG. 6, and thus description thereof is omitted.

Figure 11:
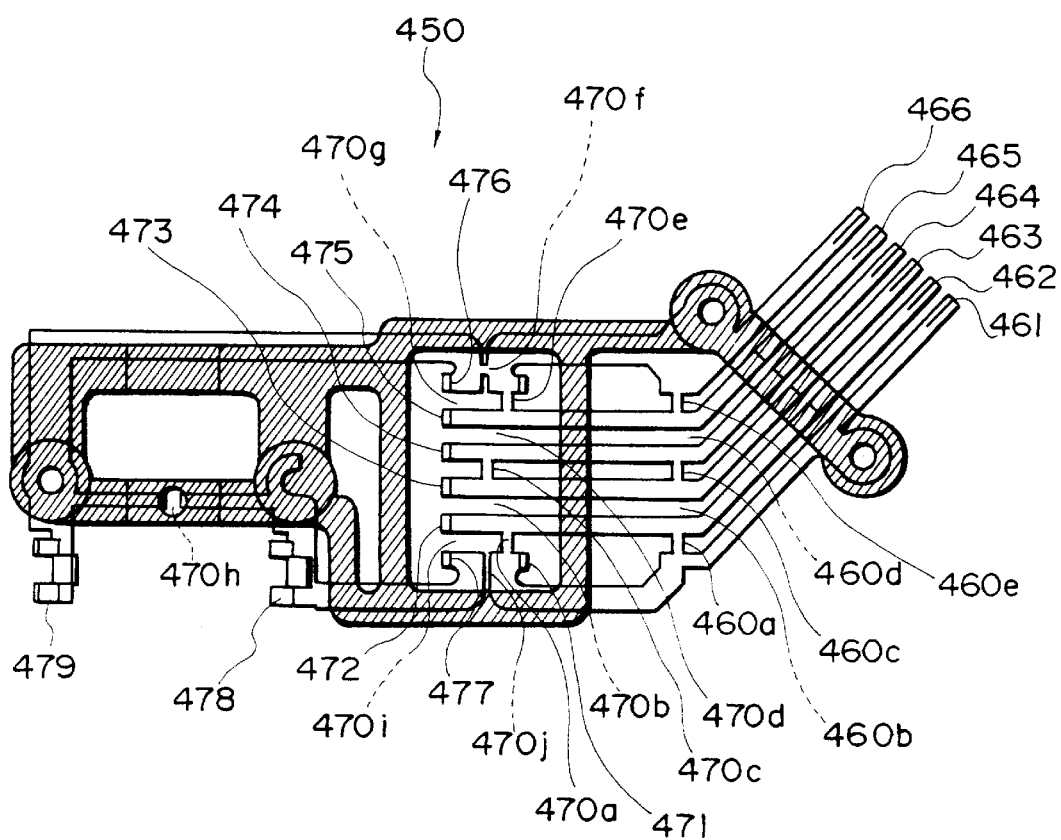
FIG. 11 shows a variant form of the conducting unit forming part of the circuit in FIG. 4C.

Next, FIG. 11 shows the conducting unit 450 forming a part of the circuit in FIG. 4C. In other words, FIG. 11 corresponds to FIG. 7.

In FIG. 11, the link portions 460b, 460d, 470b, 470d, 470e, 470f, 470g, 470h, 470i and 470j are cut. By this means, the conducting state is as follows.

Firstly, the brushes 461 and 462 (contact points 311 and 312) are connected together by link portions 460a and 470a, and are connected by connector pins 471 and 472 to the terminal 321 (see FIG. 4C).

The brushes 463 and 464 (contact points 313 and 314) are connected together by link portions 460c and 470c, and are connected by connector pins 473 and 474 to the terminal 322 (see FIG. 4C). It should be noted that the brushes 462 and 463 are electrically interrupted by cutting the link portions 460b and 470b.

Furthermore, the brushes 465 and 466 (contact points 315 and 316) are connected together by link portions 460e and 470e, and are connected to the terminal 323 (see FIG. 4C). It should be noted that the brushes 464 and 465 are electrically interrupted by cutting the link portions 460d and 470d.

The power supply clip 478 and connector pin 477 are connected electrically, and the power supply clip 479 and connector pin 476 are connected electrically, but the power supply clips 478 and 479 are electrically interrupted by cutting the link portion 470h. Additionally, the brush 466 and the power supply clip 479 are electrically interrupted by cutting the link portion 470f, and the brush 461 and the power supply clip 478 are electrically interrupted by cutting the link portions 470i and 470j.

Thus, the terminal 28b of the motor 20 shown in FIG. 1 is connected by the power supply clip 479 through the connector pin 476 to one of the terminals 324 and 325 (see FIG. 4C), and the terminal 28a of the motor 20 is connected by the power supply clip 478 through the connector pin 477 to the other of the terminals 324 and 325 (see FIG. 4C).

Figure 12A:
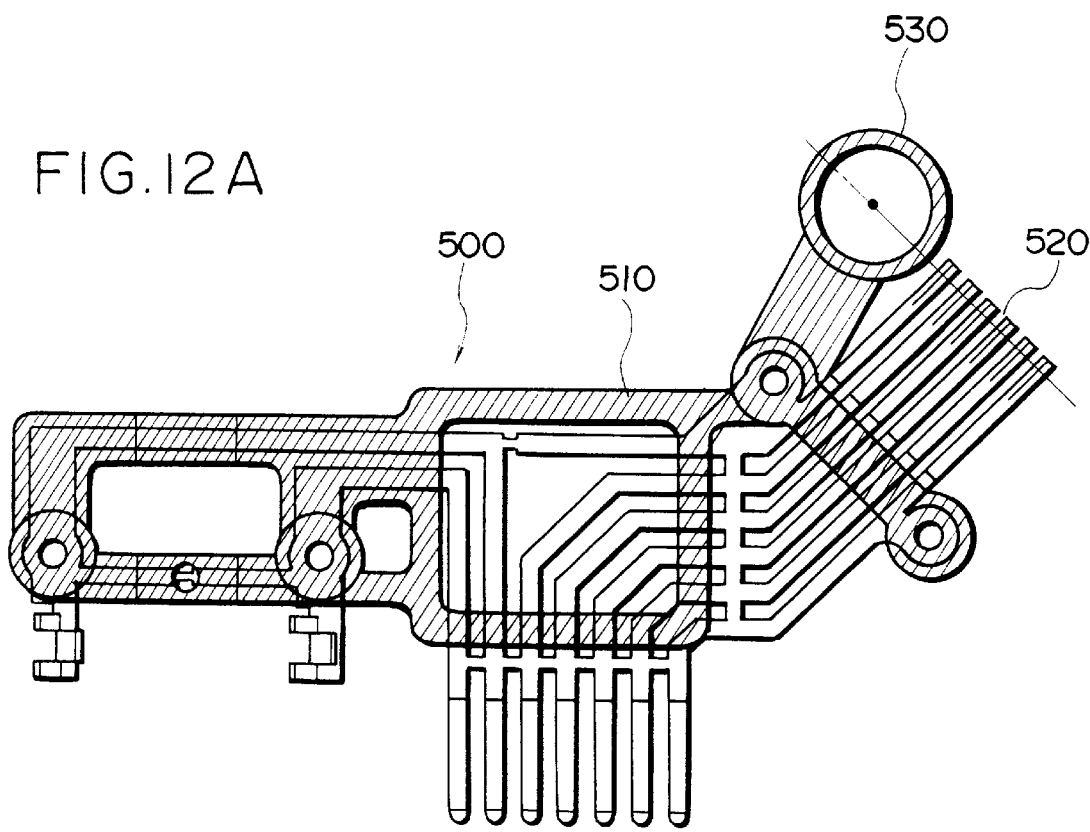
FIGS. 12A and 12B show another variant forms of the embodiment, in which the conducting unit is provided with a ring portion.
Figure 12B:
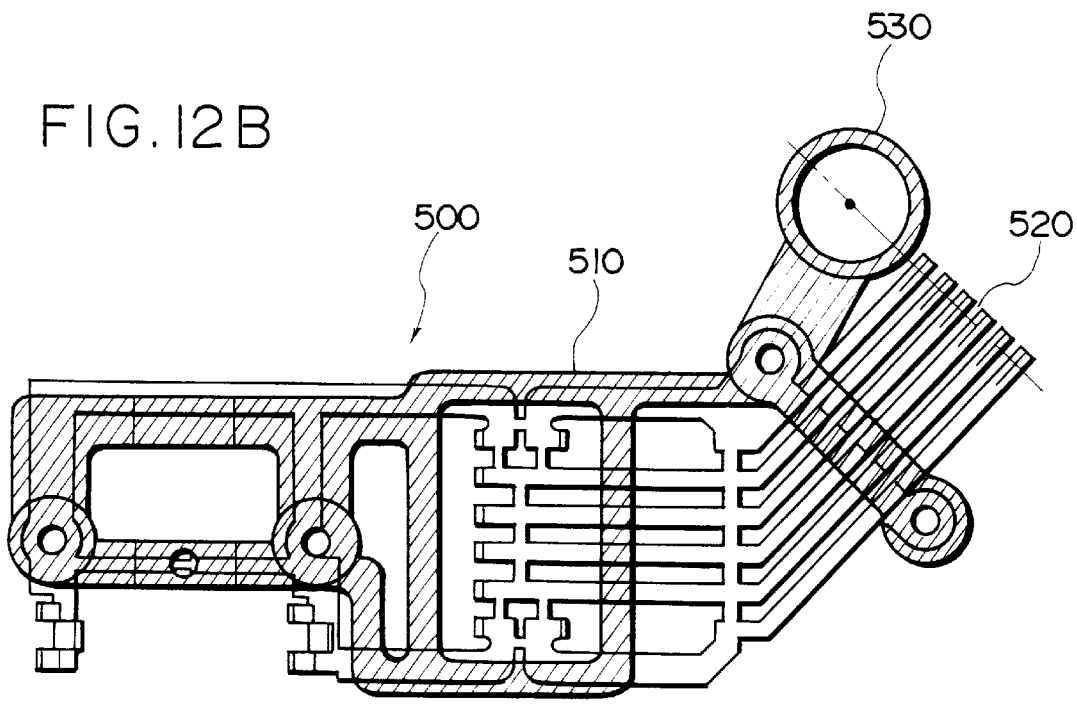

A further embodiment is now described. The conducting unit 50 shown in FIG. 1 is positioned by passing fixing holes 58 over the mounting projections 12c. In place of the fixing holes 58 and mounting projections 12c, the conducting unit 50 may be positioned by the provision of a ring portion which fits over the boss 16. FIGS. 12A and 12B show a conducting unit having such a ring portion. FIG. 12A shows an example of a conducting unit with connector pins projecting laterally, while FIG. 12B shows an example of a conducting unit with connector pins projecting vertically. The same reference numerals have been applied to both of FIGS. 12A and 12B.

In these figures, a ring portion 530 is provided extending from the side of a fixing portion 510 of a conducting unit 500. In more detail, the ring portion 530 is formed so that the center thereof is positioned on the virtual straight line through the contact points of brushes 520. In this way, when the ring portion 530 is fitted over the boss 16 of the housing 10 (see FIG. 1), the contact points of the brushes 520 are always aligned on a straight line in the radial direction of the pattern board 40. It is thus possible to drive the motor 20 accurately according to the pattern on the pattern board 40.

Figure 13:
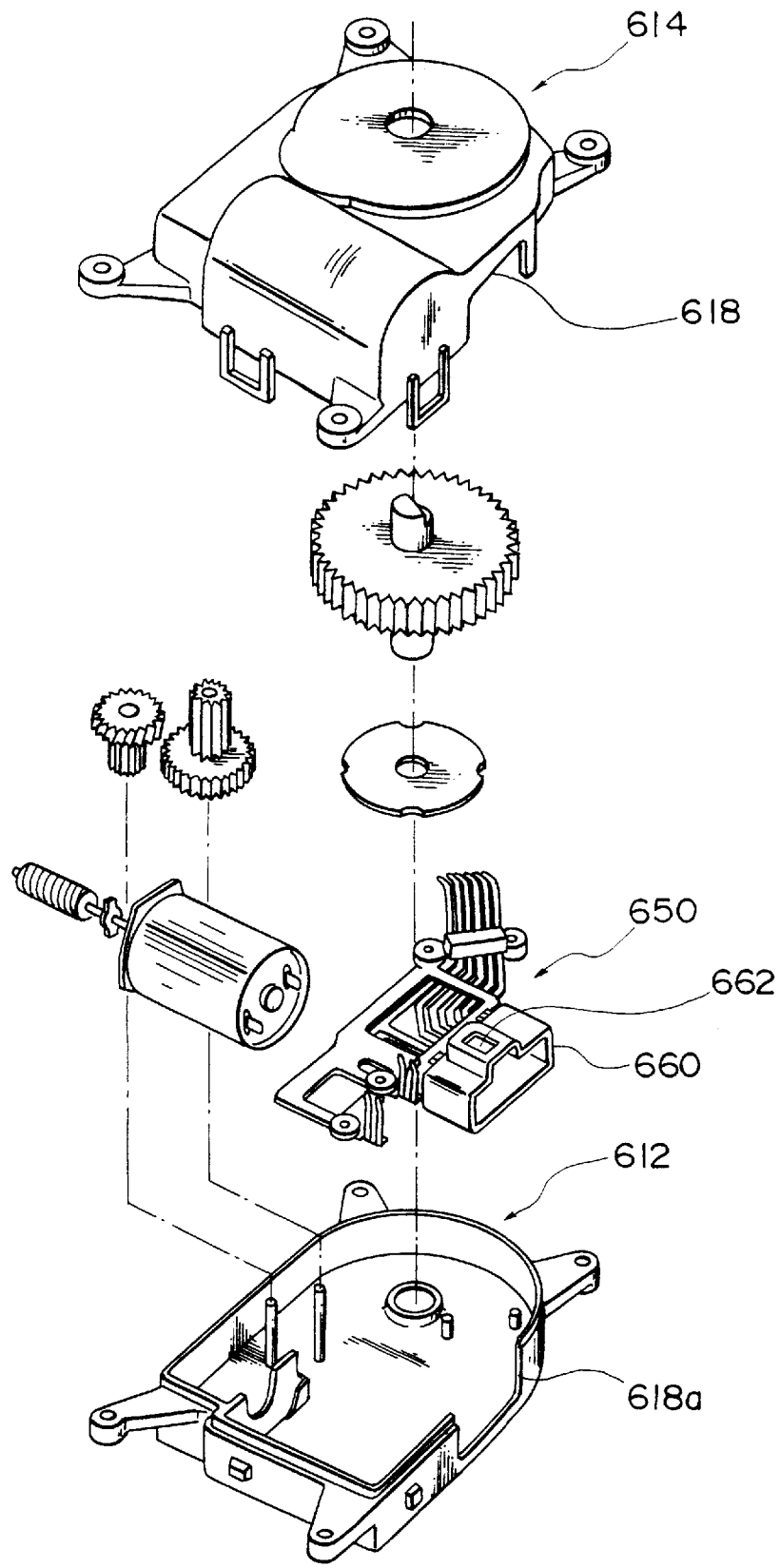
FIG. 13 shows still another embodiment.

Next, FIG. 13 shows still another embodiment, and this FIG. corresponds to FIG. 1. The motor actuator shown in FIG. 13 has a housing comprising a casing 612 and a cover 614 and holding a conducting unit 650.

In the motor actuator shown in FIG. 1, the casing 12 and cover 14 are provided with respective connecting portions 18a and 18b forming a socket into which a plug is inserted for electrical connection to the outside.

On the other hand, in the motor actuator shown in FIG. 13, the casing 612 and cover 614 are provided with cutaway portions 618a and 618b therein but not connecting portions. The cutaway portions 618a and 618b form an opening in which is disposed a connecting portion 660 so as to project to the outside. In other words, in the motor actuator of FIG. 13, the connecting portion 660 is formed separately from the housing.

Figure 14A:
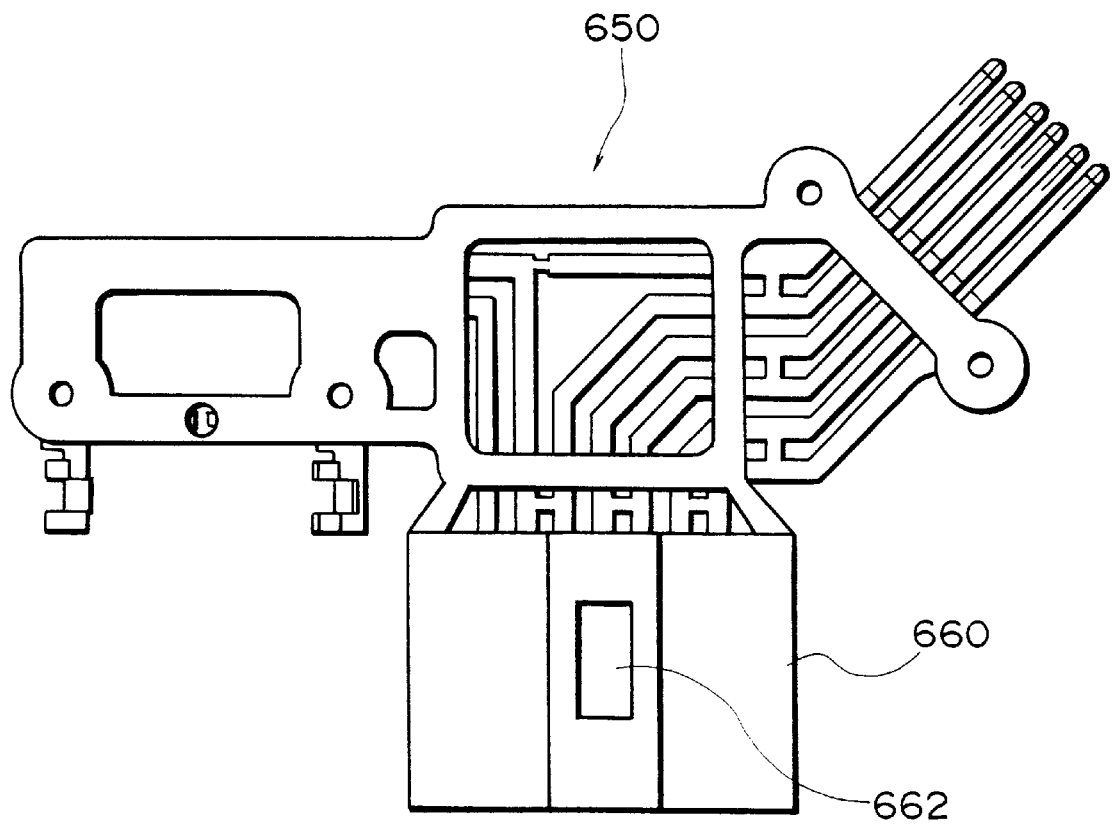
FIG. 14 shows a conducting unit in FIG. 13.
Figure 14B:
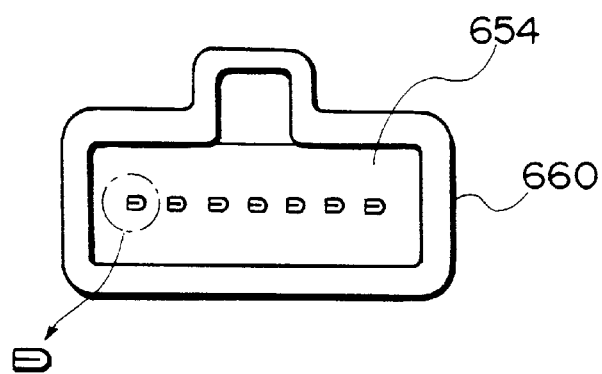

FIG. 14 shows a conducting unit 650 having a connecting portion 660. FIG. 14A shows the whole conducting unit 650 and corresponds to FIG. 5, while FIG. 14B shows a front view of the connecting portion 660.

To compare FIGS. 5 and 14A, the conducting unit 650 is substantially equivalent to the conducting unit 50 shown in FIG. 5 provided with the connecting portion 660. The connecting portion 660 is of a shape such as to receive a plug on the end of a cable for connecting to an external power supply for example, and is of a box shape with one end open. A slot 662 is also provided to engage a claw provided on a plug so as to prevent the plug from being pulled out.

Figure 15:
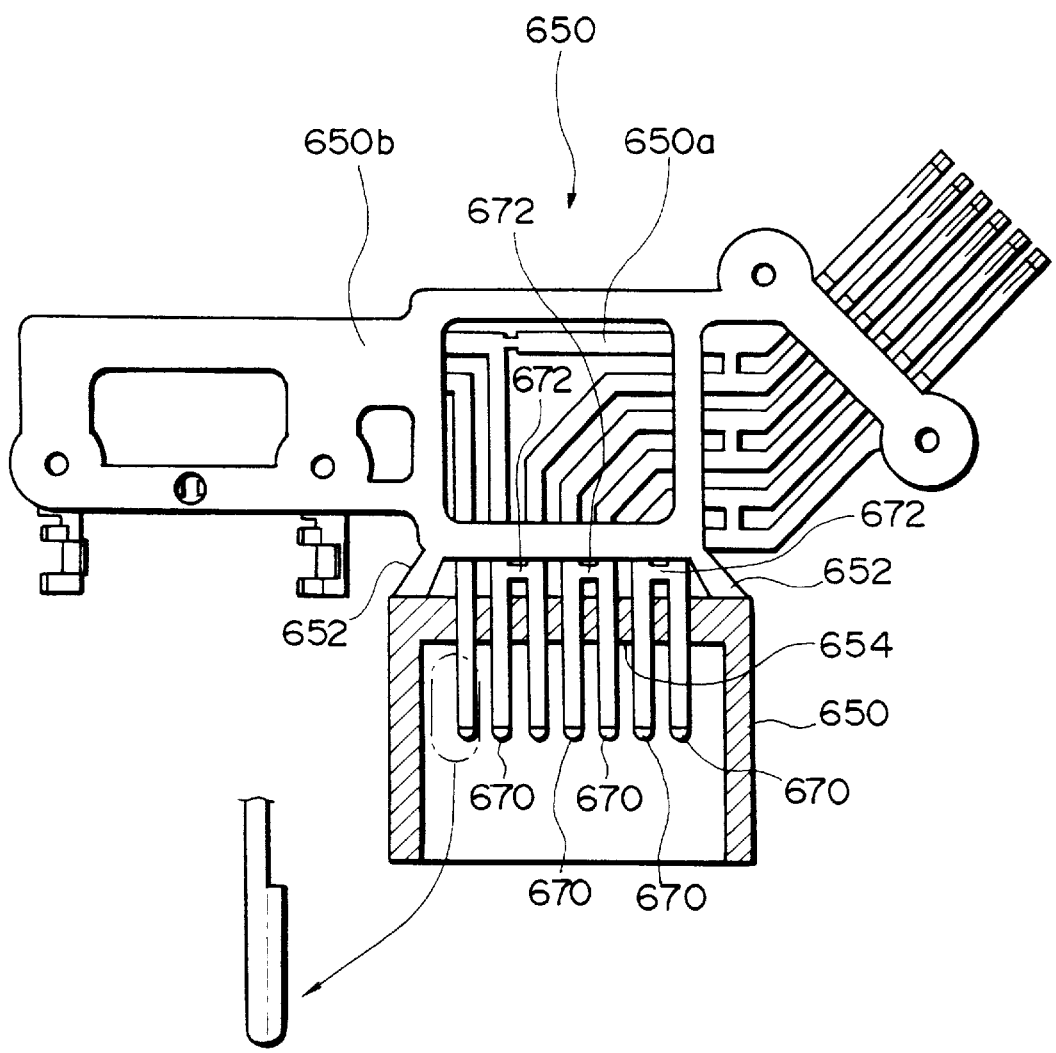
FIG. 15 is the view of FIG. 14 partly in section.

The conducting unit 650 with the connecting portion 660 partly in section is shown in FIG. 15.

The connecting portion 660 is attached by a pair of connecting portions 652 to a support member 650b which fixes a conductive plate 650a of the conducting unit 650. The support member 650b, connecting portions 652, and connecting portion 660 are formed integrally of an insulating resin.

A back wall 654 of the connecting portion 660 is formed to be penetrated by a plurality of connector pins 670 forming a part of the conductive plate 650a. As a result, the connecting portion 660 is coupled to the support member 650b through the connector pins 670 passing through the back wall 654.

Thus, the connecting portion 660 is coupled not only by the connecting portions 652 but also by the connector pins 670. In particular, since the connector pins 670 are made from a resilient and strong material such as sheet metal, the susceptibility of breakage is low. As a result, the connecting portion 660 and support member 650b can be coupled with more strength than that provided by the connecting portions 652.

In this embodiment, to provide adequate thickness for the connector pins 670, a wide portion shown enlarged in FIG. 15 is folded over along the broken line to form a doubled-over portion as shown enlarged in FIG. 14B.

In this way, the connecting portion 660 can be made easily. That is to say, if the connector pins are given adequate thickness by the provision of a central rib, as shown in FIG. 2A, the resin used to form the connecting portion 660 enters the rib. To prevent this, it is necessary to inject the resin after closing a mold having a portion which corresponds to the concave portion of the rib. In this case, however, it is possible to remove the mold after the resin has solidified, since the convex portion of the mold is engaged with the concave portion of the rib. Therefore, in order to solve this problem, a folding process is used as described above to give adequate thickness to the connector pins 670.

As described above, according to the embodiment shown in FIGS. 13 to 15 the connecting portion 660 is formed separately from the housing, and therefore reducing damage caused by inserting or removing a plug.

Moreover, the connecting portion 660 is partially coupled to the support member 650b by the connector pins 670, enabling the coupling strong.

What is claimed is:

1. A method of manufacturing a motor actuator having an output gearwheel rotated by a motor, a pattern conductor provided on one side of said output gearwheel, a plurality of brushes contacting said pattern conductor, a plurality of connectors corresponding to respective of said brushes, a housing containing said connectors, and said connectors electrically connecting said brushes to electrical components, said method comprising the steps of:

integrally and simultaneously forming said brushes and connectors partially connected by electrical link portions from a unitary conductive material;

integrally fixing together said connectors by an insulating resin;

cutting only unnecessary link portions of said electrical link portions so as to form a desired electric circuit having at least one link portion between said connectors after fixing said connectors by said insulating resin; and mounting said connectors in said housing after cutting said unnecessary link portions of said electrical link portions.

2. A method of manufacturing a motor actuator having an output gearwheel rotated by a motor, a pattern conductor provided on one side of said output gearwheel, a plurality of brushes contacting said pattern conductor, a plurality of connectors corresponding to respective of said brushes, a housing containing said connectors, and said connectors electrically connecting said brushes to electrical components, wherein said pattern conductor comprises a conducting portion formed circumferentially around an axis of said output gearwheel, and an insulating portion insulating said conducting portion, wherein said conducting portion and insulating portion are concentric with said axis and offset by a predetermined angle, and wherein at least one of said brushes avoids said insulating portion and conducts with said conducting portion, and at least one of said brushes slides on said pattern conductor in a circumferential direction, said method comprising the steps of:

integrally and simultaneously forming said brushes and connectors partially connected by electrical link portions from a unitary conductive material;

integrally fixing together said connectors by an insulating resin;

cutting only unnecessary link portions of said electrical link portions so as to form a desired electric circuit having at least one link portion between said connectors after fixing said connectors by said insulating resin; and mounting said connectors in said housing after cutting said unnecessary link portions of said electrical link portions.

3. A method of manufacturing a motor actuator having an output gearwheel rotated by a motor, a pattern conductor provided on one side of said output gearwheel, a plurality of brushes contacting said pattern conductor, a plurality of connectors corresponding to respective of said brushes, a housing containing said connectors, and said connectors electrically connecting said brushes to electrical components, wherein said pattern conductor comprises a resistor portion having a predetermined resistivity and formed in an arc around an axis of said output gearwheel, and a conducting portion electrically connected to one end of said resistor portion, and wherein at least one of said brushes contacts and conducts with said conducting portion, and at least one of said brushes contacts and conducts with said resistor portion, said method comprising the steps of:

integrally and simultaneously forming said brushes and connectors partially connected by electrical link portions from a unitary conductive material;

integrally fixing together said connectors by an insulating resin;

cutting only unnecessary link portions of said electrical link portions so as to form a desired electric circuit having at least one link portion between said connectors after fixing said connectors by said insulating resin; and mounting said connectors in said housing after cutting said unnecessary link portions of said electrical link portions.

4. A method of manufacturing a motor actuator having an output gearwheel rotated by a motor, a pattern conductor provided on one side of said output gearwheel, a plurality of brushes contacting said pattern conductor, a plurality of connectors corresponding to respective of said brushes, a housing containing said connectors, and said connectors electrically connecting said brushes to electrical components, wherein said insulating resin fixes said connectors and forms a connecting portion which connects with an external plug, said method comprising the steps of:

integrally and simultaneously forming said brushes and connectors partially connected by electrical link portions from a unitary conductive material;

integrally fixing together said connectors by an insulating resin so as to form a fixing portion and a connecting portion;

cutting only unnecessary link portions of said electrical link portions so as to form a desired electric circuit having at least one link portion between said connectors after fixing said connectors by said insulating resin; and mounting said connectors in said housing after cutting said unnecessary link portions of said electrical link portions.

5. A method of manufacturing a motor actuator having an output gearwheel rotated by a motor, a pattern conductor provided on one side of said output gearwheel, a plurality of brushes contacting said pattern conductor, a plurality of connectors corresponding to respective of said brushes, a housing containing said connectors, and said connectors electrically connecting said brushes to any electrical components, wherein said pattern conductor comprises a conducting portion formed circumferentially around an axis of said output gearwheel, and an insulating portion insulating said conducting portion, wherein said conducting portion and insulating portion are concentric with said axis and offset by a predetermined angle, wherein at least one of said brushes avoids said insulating portion and conducts with said conducting portion, and at least one of said brushes slides on said pattern conductor in a circumferential direction, and wherein said insulating resin fixes said connectors and forms a connecting portion which connects with an external plug, said method comprising the steps of:

integrally and simultaneously forming said brushes and connectors partially connected by electrical link portions from a unitary conductive material;

integrally fixing together said connectors by an insulating resin so as to form a fixing portion and a connecting portion;

cutting only unnecessary link portions of said electrical link portions so as to form a desired electric circuit having at least one link portion between said connectors after fixing said connectors by said insulating resin; and mounting said connectors in said housing after cutting said unnecessary link portions of said electrical link portions.

6. A method of manufacturing a motor actuator having an output gearwheel rotated by a motor, a pattern conductor provided on one side of said output gearwheel, a plurality of brushes contacting said pattern conductor, a plurality of connectors corresponding to respective of said brushes, a housing containing said connectors, and said connectors electrically connecting said brushes to electrical components, wherein said pattern conductor comprises a resistor portion having a predetermined resistivity and formed in an arc around an axis of said output gearwheel, and a conducting portion electrically connected to one end of said resistor portion, wherein at least one of said brushes contacts and conducts with said conducting portion, and at least one of said brushes contacts and conducts with said resistor portion, and wherein said insulating resin fixes said connectors and forms a connecting portion which connects with an external plug, said method comprising the steps of:

integrally and simultaneously forming said brushes and connectors partially connected by electrical link portions from a unitary conductive material;

integrally fixing together said connectors by an insulating re sin so as to form a fixing portion and a connecting portion;

cutting unnecessary link portions of said electrical link portions so as to form a desired electric circuit having at least one link portion between said connectors after fixing said connectors by said insulating resin; and mounting said connectors in said housing after cutting said unnecessary ink portions of said electrical link portions.

* * * * *